United States Patent
Crabtree

[15] 3,668,211
[45] June 6, 1972

[54] CERTAIN 6-HYDROXY 2-(1H) PYRIDONES

[72] Inventor: Allen Crabtree, Manchester, England

[73] Assignee: Imperial Chemical Industries Limited, London, England

[22] Filed: Oct. 30, 1969

[21] Appl. No.: 872,745

Related U.S. Application Data

[63] Continuation-in-part of Ser. No. 860,030, Sept. 22, 1969, abandoned.

[30] Foreign Application Priority Data

Dec. 9, 1968  Great Britain.....................58,281/68
Dec. 11, 1968 Great Britain.....................58,834/68

[52] U.S. Cl.................260/294.9, 260/247.2 A, 260/268 H, 260/293.69, 260/294.8 D, 260/295 AM, 260/295 R
[51] Int. Cl. .....................................................C07d 31/46
[58] Field of Search................260/294.9, 295.5 A, 295 AM

[56] References Cited

UNITED STATES PATENTS 3,503,986  3/1970  Seidel et al. .....................260/294.9

Primary Examiner—Alan L. Rotman
Attorney—Cushman, Darby & Cushman

[57] ABSTRACT

Compounds of the formula

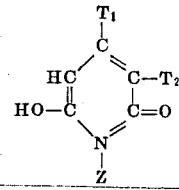

wherein $T_1$ represents a hydrogen atom or a group of the formula —$COOR^1$ or $CONR^1R^2$, or an aliphatic, araliphatic, homocyclic or heterocyclic radical, $T_2$ represents a group of the formula —CN, —$COOR^1$ or $CONR^1R^2$, $R^1$ and $R^2$ each independently represents a hydrogen atom or an aliphatic, araliphatic, homocyclic or heterocyclic radical or —$NR^1R^2$ represents a heterocyclic radical, and Z represents an aliphatic radical having a primary or secondary amono group substituted therein, are valuable dyestuff intermediates being useful as coupling components for the manufacture of a wide variety of azo compounds.

2 Claims, No Drawings

CERTAIN 6-HYDROXY 2-(1H) PYRIDONES

This application is a continuation-in-part of Ser. No. 860,030, filed Sept. 22, 1969, now abandoned.

This invention relates to new heterocyclic compounds and more particularly to hydroxy pyridone compounds valuable for use as dyestuff intermediates.

According to the invention there are provided heterocyclic compounds of the formula:

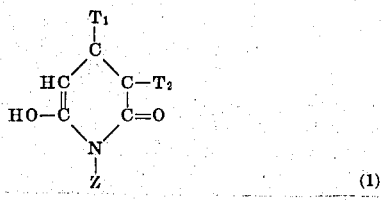

(1)

wherein $T_1$ represents a hydrogen atom or a group of the formula —$COOR^1$ or $CONR^1R^2$, or an aliphatic, araliphatic, homocyclic or heterocyclic radical, $T_2$ represents a group of the formula —CN, —$COOR^1$ or $CONR^1R^2$, $R^1$ and $R^2$ each independently represents a hydrogen atom or an aliphatic, araliphatic, homocyclic or heterocyclic radical or —$NR^1R^2$ represents a heterocyclic radical, and Z represents an aliphatic radical having a primary or secondary amino group substituted therein.

As examples of aliphatic radicals represented by $T_1$, $R^1$ and $R^2$, there may be mentioned alkyl, more especially lower alkyl groups, by which term is meant groups containing 1 to 4 carbon atoms, for example, methyl, ethyl, n-propyl and n-butyl, hydroxy lower alkyl, e.g. β-hydroxy-ethyl, lower alkoxy lower alkyl, e.g. β-methoxy-ethyl and β-ethoxyethyl, cyanomethyl, carbamoylmethyl, carbethoxymethyl and acetylmethyl.

As examples of araliphatic radicals represented by $T_1$, $R^1$ and $R^2$, there may be mentioned benzyl and β-phenylethyl.

As examples of homocyclic radicals represented by $T_1$, $R^1$ and $R^2$ there may be mentioned cycloalkyl, e.g. cyclohexyl, aryl and substituted aryl radicals, more particularly those of the benzene series, e.g. phenyl, tolyl, chlorophenyl, carboxyphenyl, methoxyphenyl and sulphophenyl.

As examples of heterocyclic radicals represented by $T_1$, $R^1$ and $R^2$, there may be mentioned in particular 5- or 6-membered heterocyclic rings whether alicyclic or aromatic in nature, e.g. 2-pyridyl, 2-thiazolyl, 1-piperidyl, 1-morpholinyl, 1-piperazinyl and 1-pyrrolidinyl.

As examples of aliphatic radicals represented by Z, there may be mentioned radicals of the general formulae:

—$(C_nH_{2n})$—$NH_2$  (2)

where n has a value of from 2 to 10, the symbol $C_nH_{2n}$ representing a linear or branched hydrocarbon radical, —$(CH_2CH_2NH)_m CH_2CH_2NH_2$  (3)

where m has a value of 1, 2 or 3,

—$(CH_2CH_2O)_p CH_2CH_2NH_2$  (4)

wherein p has a value of 1 or 2, and —$CH_2CH_2NHR$ where R represents an alkyl or carbocyclic radical, for example 2-amino ethyl, 3-aminopropyl, 6-amino-n-hexyl, 10-amino-n-decyl, 2-aminopropyl, 2-(2'-aminoethylamino)ethyl, 2-(ethylamino)ethyl, 2-methyl-amino)ethyl and 2-(phenylamino)ethyl.

Thus as specific examples of heterocyclic compounds of the invention, there may be mentioned the following:

N-β-aminoethyl-3-cyano-4-methyl-6-hydroxy-2-pyridone
N-β-aminoethyl-3-cyano-4-phenyl-6-hydroxy-2-pyridone
N-Γ-aminopropyl-3-cyano-4-phenyl-6-hydroxy-2-pyridone
N-(N-β-aminoethyl)-β-aminoethyl-3-cyano-4-methyl-6-hydroxy-2-pyridone
N-(β-aminoethoxy)-ethyl-3-cyano-4-methyl-6-hydroxy-2-pyridone
N-(β-aminopropyl)-3-cyano-4-methyl-6-hydroxy-2-pyridone
N-(β-aminopropyl)-3-cyano-4-phenyl-6-hydroxy-2-pyridone
N-β-(ethylamino)ethyl-3-cyano-4-methyl-6-hydroxy-2-pyridone
N-β-aminoethyl-3-cyano-4-carbonamido-6-hydroxy-2-pyridone
N-β-aminoethyl-3-cyano-4-carboxyethyl-6-hydroxy-2-pyridone
N-β-aminoethyl-3-carboxy-4-methyl-6-hydroxy-2-pyridone
N-β-aminoethyl-3-carbonamido-4-methyl-6-hydroxy-2-pyridone
N-β-aminoethyl-3-cyano-4-cyclohexyl-6-hydroxy-2-pyridone
N-β-aminoethyl-3-cyano-4-(pyridin-3'-yl-methyl-6-hydroxy-2-pyridone
N-(2'-aminoethylamino)ethyl-3-cyano-4-carbondimethylamido-6-hydroxy-2-pyridone According to a further feature of the invention, there is provided a process for manufacture of the new heterocyclic compounds which comprises reacting together a compound of the formula:

$NH_2$—Z  (5)

a compound of the formula:

$T_1 \cdot COCH_2COO$ alkyl  (6)

and a compound of the formula:

$T_2 \cdot CH_2COO$ alkyl  (7)

wherein the symbols $T_1$, $T_2$ and Z have the meanings stated above.

The above process can be carried out by mixing together all three reactants using an excess of compound 5 whereby the new heterocyclic compounds are obtained directly in a single step. Alternatively, compounds 6 and 5 can first be reacted together to form a compound of the formula:

$T_1 CO \cdot CH_2 CONHZ$  (8)

which is then reacted with compound 7 in the presence of a basic catalyst to form an α,β-substituted glutaconamide of formula:

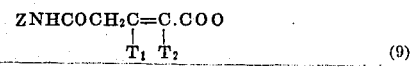

(9)

which can be cyclised by heating with a basic substance, e.g. sodium ethoxide, a strongly basic amine or an inorganic base.

Alternatively compounds 5 and 7 can first be reacted together to form a compound of the formula:

$T_2 CH_2 CONHZ$  (10)

which is then reacted with compound (6) in the presence of a basic catalyst to form an α·β-substituted glutaconamide of formula:

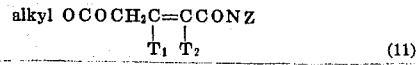

(11)

which can be cyclised by heating with a basic substance.

As examples of compounds 5, 6 and 7, there may be mentioned the following:

(5) $NH_2Z$ ethylene-diamine, 1,3-propylene diamine, 1,2-propylene diamine, 1,6-hexamethylene diamine, 1,10-decamethylene diamine, diethylene triamine, triethylene tetramine, 2,2'-diaminodiethyl ether, and N-ethyl, methyl and phenyl ethylene diamines.

(6) $T_1COCH_2COO$ Alkyl ethylacetoacetate, ethyl benzoylacetate, diethyl acetonedicarboxylate, diethyl oxal-acetic ester, ethyl 4-hydroxyacetoacetate, ethyl 4-phenylacetoacetate and ethyl 4-(3'-pyridyl)-acetoacetate.

(7) $T_2CH_2COO$ Alkyl ethyl cyanacetate

The invention also provides a modification of the above process for manufacture of the new heterocyclic compounds wherein in place of the compound of formula (5) there is used a monoacyl derivative of an aliphatic diamine, represented by the general formula:

$NH_2 Z^1$  (12)

wherein $Z^1$ represents an aliphatic radical containing an acylamino group, and subjecting the compound of formula:

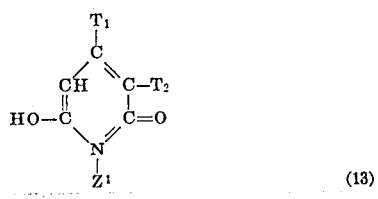

to an acid hydrolysis to convert the group $Z^1$ to an aliphatic radical containing a primary amino group.

The new heterocyclic compounds are valuable coupling components for use in the manufacture of azo dyestuffs in which the presence of an aliphatically-bound amino group is desirable, e.g. for manufacture of reactive dyes for cellulose or wool.

The invention is illustrated by the following Example in which parts are by weight.

EXAMPLE

Preparation of N-β-aminoethyl-3-cyano-4-methyl-6-hydroxy-2-Pyridone

A solution of 180 parts of ethylenediamine in 100 parts of water at 20°–25° C. is added to a stirred mixture of 65 parts of acetoacetic ester and 56.5 parts of cyanoacetic ester at 20° C. The temperature is allowed to rise to 50°–55° C. without external cooling, and when the heat of reaction begins to subside, the mixture is heated at 50± 2° C. for 15–20 hours. The solution is then evaporated in vacuo at 80° C. for 2 hours to remove unchanged starting materials and the residue is dissolved in 400 parts of water. The cooled solution is then acidified with 115 parts of hydrochloric acid (36°Tw) until weakly acid to congo red. After stirring at below 10° C. for several hours, the product is collected by filtration, washed with 200 parts of cold water and dried.

The product (46.1 parts) decomposes on melting at 265° C. and on analysis is found to contain C, 53.4; H,5.4; N,20.7; $C_9H_{11}O_2N_3 \cdot \frac{1}{2}H_2O$ requires C,53.45; H,5.95; N,20.8.

Further examples of the invention are found in the Table prepared by similar methods to that described in Example I, when one equivalent of each of the two esters is heated with an excess of the amine in Column IV and the product isolated as described in Example I.

EXAMPLE 16

If, in place of the 180 parts of ethylenediamine used in Example I there are used 306 parts of monoacetyl ethylenediamine, there is obtained N-β-acetylaminoethyl-3-cyano-4-methyl-6-hydroxy-2-pyridone.

The product decomposes with melting at 254°–6° C and on analysis is found to contain C,=55.1, H,=5.3; $C_{11}H_{13}N_3O_3 \cdot \frac{1}{4}H_2O$ required C=55.0; H=5.5.

A mixture of 117 parts of the monoacetyl compound prepared above is then boiled under a reflux condenser with 200 parts of hydrochloric acid (2N) for 4 hours when solution was complete. One part of decolorizing carbon was then added and the mixture boiled for a further 10 minutes. The solution was screened and the filtrates evaporated to dryness under reduced pressured. The product was identical with a sample of N-β-aminoethyl-3-cyano-4-methyl-6-hydroxy-2-pyridone, evaporated to dryness under vacuum from a 2N hydrochloric acid solution.

WHAT WE CLAIM IS:

1. N - β -aminoethyl-3-cyano-4-methyl-6-hydroxy-2-pyridone.

2. A heterocyclic compound of the formula:

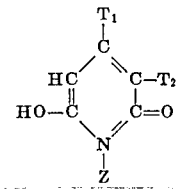

wherein $T_1$ is hydrogen, lower alkyl, phenyl, cyclohexyl, lower alkoxycarbonyl, lower hydroxyalkyl or carbethoxymethyl;

$T_2$ is CN or $CONH_2$; and
Z is
—$(C_nH_{2n})NH_2$     where n is 2–10,
—$(C_2H_4NH)_mC_2H_4NH_2$   where m is 1–3,
—$(C_2H_4O)_pC_2H_4NH_2$   where p is 1–3, or
—$C_2H_4NHC_2H_5$

| I Example | II Ester | III Ester | IV Amine | V Pyridone |
|---|---|---|---|---|
| 2 | Ethyl acetoacetate | Ethyl cyanoacetate | 1,3-diaminopropane | N-(γ-aminopropyl)-3-cyano-4-methyl-6-hydroxy-2-pyridone. |
| 3 | do | do | N-ethylethylenediamine | N-(N-ethylaminoethyl)-3-cyano-4-methyl-6-hydroxy-2-pyridone. |
| 4 | do | do | 1,6-hexamethylenediamine | N-(6-aminohexyl)-3-cyano-4-methyl-6-hydroxy-2-pyridone. |
| 5 | do | do | Triethylenetetramine | N-(2'-aminoethylamino)ethyl-3-cyano-4-methyl-6-hydroxy-2-pyridone. |
| 6 | do | do | 2,2'-diaminodiethylether | N-(β-aminoethoxyethyl)-3-cyano-4-methyl 6-hydroxy-2-pyridone. |
| 7 | Ethyl benzoylacetate | do | Ethylenediamine | N-β-aminoethyl-3-cyano-4-phenyl-6-hydroxy-2-pyridone. |
| 8 | do | do | 1,3-diaminopropane | N-γ-aminopropyl-3-cyano-4-phenyl-6-hydroxy-2-pyridone. |
| 9 | do | do | 1,2-diaminopropane | N-β-aminopropyl-3-cyano-4-phenyl-6-hydroxy-2-pyridone. |
| 10 | Ethyl cyclohexoylacetate | do | Ethylenediamine | N-β-aminoethyl-3-cyano-4-cyclohexyl-6-hydroxy-2-pyridone. |
| 11 | Ethyl acetoacetate | Ethyl malonate monoamide | do | N-β-aminoethyl-3-carbonamido-4-methyl-6-hydroxy-2-pyridone. |
| 12 | Oxalacetic ester | Ethyl cyanacetate | do | N-β-aminoethyl-3-cyano-4-carboxy-ethyl-6-hydroxy-2-pyridone. |
| 13 | Ethyl-4-hydroxyacetoacetate | do | do | N-β-aminoethyl-3-cyano-4-hydroxy-methyl-6-hydroxy-2-pyridone. |
| 14 | 4-(3'-pyridyl)-acetoacetate | do | do | N-β-aminoethyl-3-cyano-4-(pyridin-3'-yl)-methyl-6-hydroxy-2-pyridone. |
| 15 | Diethylacetone dicarboxylate | do | do | Ethyl ester of N-β-aminoethyl-3-cyano-(4-carboxymethyl)-6-hydroxy-2-pyridone. |

\* \* \* \* \*

Notice of Adverse Decision in Interference

In Interference No. 98,958 involving Patent No. 3,668,211, A. Crabtree, CERTAIN 6-HYDROXY 2-(1H) PYRIDONES, final judgment adverse to the patentee was rendered Mar. 26, 1976, as to claims 1 and 2.

[*Official Gazette June 22, 1976.*]